Aug. 20, 1935.  E. H. FRENCH  2,012,125
WATER SOLUBLE RESINATE PRODUCTION
Filed Nov. 26, 1932
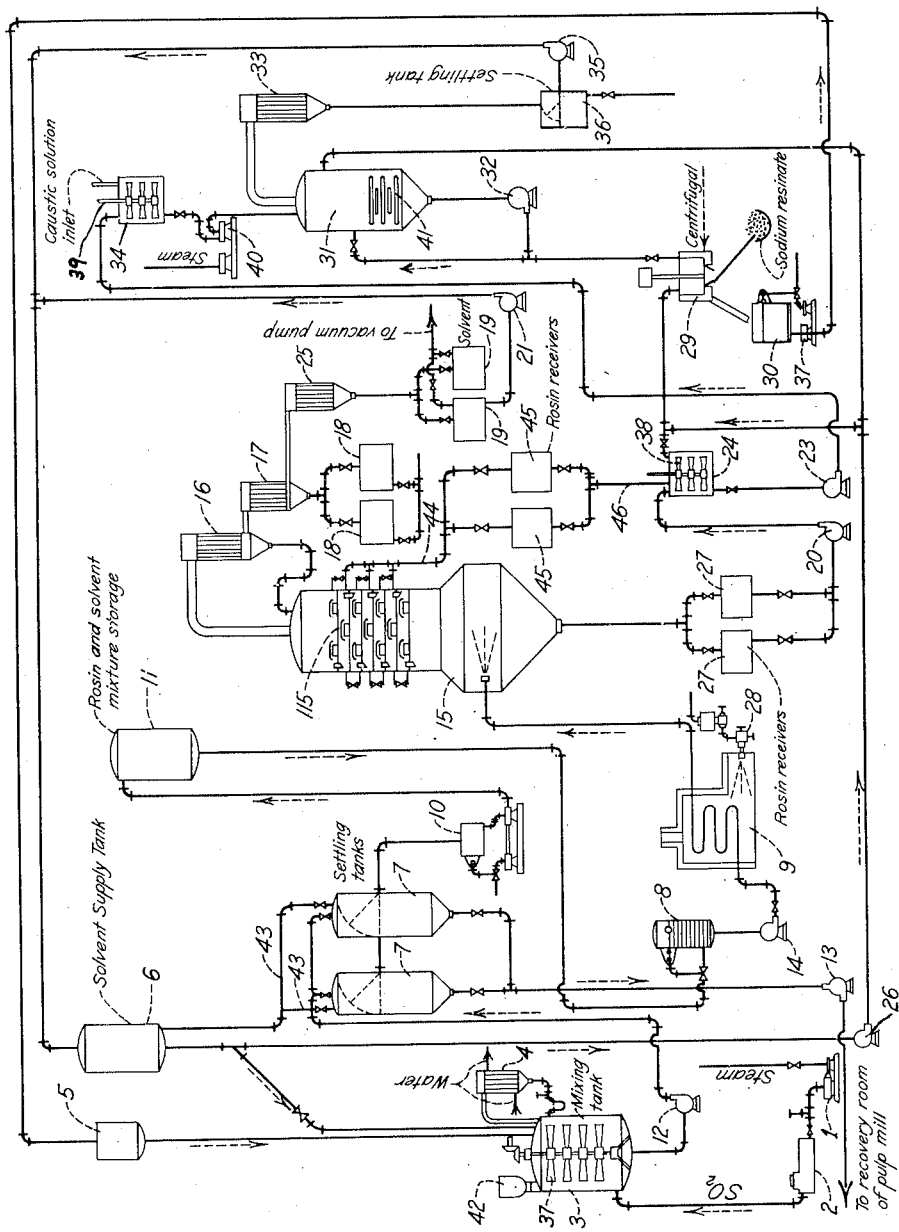
Edward H. French, INVENTOR.
BY C. E. Howson
ATTORNEYS.

Patented Aug. 20, 1935

2,012,125

UNITED STATES PATENT OFFICE 2,012,125

WATER SOLUBLE RESINATE PRODUCTION

Edward H. French, Columbus, Ohio

Application November 26, 1932, Serial No. 644,505

16 Claims. (Cl. 260—108)

The invention relates to the production of highly purified rosin and resinous by-products from low-grade sources, and more particularly it concerns a process for the separate recovery of crystallizable rosin and resin salts of high purity, and also a relatively pure mixture of fatty acids and oily substances, from certain raw materials such as the waste liquors produced in the sulphate and soda processes of wood pulp manufacture.

The present invention is in part a continuation of my co-pending application Serial No. 310,111, filed October 3rd, 1928 for Method of purifying resins, now Patent No. 1,916,104, dated June 27, 1933.

During the pulping of wood by alkaline pulping processes, the cellulose of the wood is separated from the other substances such as ligneous matter, resins and various organic decomposition products, water and chemicals which together are designated "black liquor". Accompanying the resins in the "black liquor" there are varying amounts of various oxygen-containing organic compounds such as fatty acids or oily substances, and possibly others of an alcoholic nature such as pine oil, which are derived from the wood in the chemical digestion thereof. The amounts of these compounds present in the wood varies considerably, depending upon such factors as the species and age of the tree, the part of the tree from which the wood is obtained, the soil, etc.

In the alkaline pulping processes, the resins and oily substances are believed to occur in the form of water soluble salts or soaps. These may then be decomposed by treatment with a mineral acid, or by means of a suitable acid gas as disclosed in my Patents No. 1,693,586 and No. 1,810,472. The rosin and said oxygen-containing compounds thus released are then dissolved in a suitable solvent therefor, such as gasoline, kerosene, naphtha, or gas oil.

According to the invention described in my co-pending application No. 172,821, filed March 4, 1927, now Patent No. 1,889,405, and in application No. 310,111, filed October 3, 1928, for Method of purifying resins and product produced thereby, a solution of rosin in a volatile solvent is distilled under high vacuum at temperatures below 275° C., preferably by a flash-vaporizing process, whereby rosin is distilled overhead in the presence of a substantial portion of the solvent, and the rosin is recovered practically undecomposed. After its condensation in well-known manner, either in the presence of the solvent or separately therefrom, the purified rosin is adapted to be treated in manner to produce a neutral water soluble resinate which is of a grade highly satisfactory for use in the soap industry and others. However, when the crude rosin, from which the solution to be thus treated was formed, had been secured from certain sources and contained an unusually high percentage of the oily substances or fatty acids, the final products were extremely difficult to obtain in pure form.

I have now discovered that the solvents used possess the property under certain conditions of extracting from mixtures containing rosin and other oxygen-containing compounds and decomposition products, such as crude "black liquor" and concentrates associated therewith, not only the rosin content thereof but also various coloring and odor-producing bodies, which render the mixture cloudy and which subsequently must be removed prior to distillation of the mixture in order to render the rosin produced fully satisfactory for many purposes, as for instance, the manufacture of neutral sodium resinate and high grade rosin. Moreover, I have determined experimentally that in the distillation of such a solution of rosin, if the concentration of the rosin in solution is too high, then upon the distillation of such concentrated solution under high vacuum at suitable temperatures, in the manner indicated in my Patent No. 1,810,472, the final distilled product or rosin-fatty acid mixture frequently will have an objectionable burned wood odor. Furthermore, when such distilled rosin is treated in the manner described in my copending application Serial No. 172,821, for the manufacture therefrom of sodium resinate, there is at times a notable tendency for certain objectionable impurities to precipitate out with the resinate upon removal of the water.

I have now discovered that these objectionable coloring and odor-producing bodies can be eliminated by diluting the solution of rosin prior to the distillation with sufficient of the solvent to reduce the rosin concentration to a point where the aforementioned impurities will precipitate out when the solution is cool. While the proportion of these impurities which precipitate upon cooling depends somewhat upon the degree of dilution with the solvent, I have found that usually all of such impurities are removed when a concentration of approximately 1 part by weight of rosin or rosin-fatty acid mixture to 5 or more parts of solvent is employed.

The brownish-black mass of impurities thus precipitated upon diluting the cool solution of rosin sinks to the bottom of the containing vessel upon settling, or to the water line if water is present, and the clear solution of rosin, solvent, and fatty substances may be decanted, filtered, or otherwise separated from the impurities. While the composition of the removed impurities is not known, they are believed to be in the nature of glucocides.

According to the present invention, while the concentration of the rosin or total rosin-fatty substance mixture present in the solution being distilled is preferably adjusted in the ratio of 1 part by weight of the former to 5 or 6 parts of the solvent, greater dilutions may be less economically employed. The rosin obtained by distilling the resultant solution after removal of the precipitate, is free from objectionable odor and light in color.

The fatty materials and other oxygen-containing organic compounds which accompany the impure rosin, especially when obtained from such source as alkaline pulping liquors and concentrates therefrom, and which are probably largely mixtures of oleic and linoleic acids, and may contain in certain instances pine oil and other oily substances of an alcoholic nature, tend when present to distill with the rosin and, when in substantial amounts in the rosin solution, render the solution generally unsuitable for resinate manufacture. In some instances their presence prevents the precipitation of granular resinates or crystals. Particularly is this true where the fatty or oily substances are present in amounts equal to or greater than the rosin. Moreover, when such a mixture of rosin, fatty acids and oily substances are distilled under vacuum by the methods in use prior to my invention, sufficient decomposition of either the rosin or fatty acids or both occurs to form products, the presence of which in the mixture in the amount formed prevent crystallization of the rosin, when it is desired to produce it instead of the resinate. Neither the rosin nor the fatty substances thus obtained can have a high commercial value because of the presence of the other.

Applicant has discovered that these fatty or oily substances and other such oxygen-containing compounds may be effectively separated from the rosin and recovered, so as concurrently to render the rosin crystallization practicable while recovering a valuable product having many commercial uses. This is preferably accomplished in connection with the step of distilling under high vacuum the solution of rosin and the said substances, under conditions inhibiting their decomposition and that of the rosin, the latter remaining behind as a still product. A high grade of mixed oily substances or fatty acids is thus produced, employing a high vacuum distillation, preferably using a form of flash-vaporization hereinafter more specifically described, at high temperatures but below the normal distillation point of the rosin. The distillation of the fatty or oily substances may if desired be carried out under high vacuum alone and without flash-vaporizing the mixture. When kerosene is employed as the solvent, the fatty acid fraction distills over between 180° and 250° C., under a vacuum of 28–29 inches of mercury. The fatty or oily substances are then condensed either in the presence of the solvent or separate therefrom, and are recovered. The rosin remaining in the still is suitable for use in making crystallizable rosin, or it may be used for making resinates such as described in my co-pending application Serial No. 172,821 without further distillation for purifying purposes.

According to another modification of the invention, the solution of rosin and the said oxygen-containing substances is distilled under high vacuum, preferably by means of a flash-vaporizing process described above, at temperatures below 275° C., and preferably around 250°–260° C., when using a vacuum of 28–29 inches of mercury. The distillation is so performed that a mixture of rosin, oxygen-containing substances including fatty acids, and the organic solvent distill off. The rosin and fatty acids are condensed in the presence of a part at least of the organic solvent. The condensate is then concentrated and cooled as necessary, whereupon the rosin crystallizes out, leaving the fatty acids and other oxygen-containing substances behind in the solvent. Under the distillation conditions named, substantially no rosin decomposition occurs. In the event that there is a sufficient amount of the fatty acids and other oxygen-containing substances, liquid at normal temperatures, present to serve both as a rosin solvent and to so reduce the distillation temperature under the conditions named as to prevent decomposition during distillation, the amount of solvent to be added to dissolve the rosin can be correspondingly reduced. In fact, if a sufficient amount of such oxygen-containing substance is present or added, no additional rosin solvent need be used.

When it is desired to convert the fatty acid-free rosin to sodium resinate, after the removal of the distillable fatty substances and the like therefrom, the rosin is dissolved in a solvent such as kerosene or gasoline, preferably in such amount as to give a solution containing around one part by weight of rosin to two or more parts of the solvent. The rosin in this solution is then reacted at suitable temperatures, preferably around the boiling point of water, with an aqueous caustic soda solution or its equivalent, the caustic alkali being present in amount sufficient to neutralize at least a major portion of the resin, in some cases about 70%. A clear solution containing these substances is thereby produced, which is well adapted to insure intimate contact of the reactive agents. The said solution, which under some conditions may exist as an emulsion, is then heated to vaporize the water and a portion of the solvent, the latter of which in major part at least is replaced continuously or intermittently to avoid the development of too great a concentration of rosin in the solvent. As soon as the water is distilled substantially completely away, precipitation of the sodium resinate occurs in the form of crystals or granules in amount depending upon such factors as the concentration of reactants and the degree to which the oily and fatty substances and impurities previously have been eliminated from the rosin. Under the conditions named above, approximately 50 per cent of the neutral resinate precipitates upon cooling to around room temperature, the balance remaining in the mother liquor which still contains some rosin in solution, from which the precipitated resinate is filtered. The latter is then washed with a suitable liquid such as clean rosin solvent, and the excess solvent is then removed as by centrifuging or the like.

The resultant neutral resinate appears to be a new product heretofore unknown. It is predominately crystalline, consisting of acicular crystals showing parallel extension and moderate birefringence, sign of elongation (—), index of high ray equals 1.57 plus, crystaal probably orthorhombic. The crystals are small, five times as long as their width. The width of the crystals ordinarily is about five microns (.005 mm). The material consists of a matted aggregate of these tiny crystals apparently free from other crystalline substances. The tiny crystals are easily separated from each other and dispersed, as by the use of pressure. The neutral resinate making up the aggregates of crystals lacks the sticky or tacky feel of the sticky mixture of resinate associated with a colloidal mass which results in the usual processes for making water-soluble resinates prior to my invention. The crystals of the new product are therefore readily amenable to washing or other purification treatment.

Prior to the present invention, when sodium resinate was precipitated in the manner hereinbefore described, it has been impossible to precipitate or crystallize all of the residual resinate in the mother liquor by the simple addition to the hot liquor of additional caustic alkali in aqueous solution, even by alternately heating and cooling, because of the fact that the boiling point of the water present in the alkaline solution is so much lower than that of the rosin-resinate-solvent of the mother liquor that an immediate and violent boil-over of the still occurs. It therefore has been necessary to further concentrate the mother liquor and then to rapidly cool it down to precipitate additional resinate therefrom.

Applicant has discovered that this additional work and expense can be avoided by adding to the mother liquor without cooling it, a solution prepared by adding to an unheated or heated solution of rosin in a rosin solvent such as kerosene an aqueous solution of caustic alkali or its equivalent in amount sufficient to neutralize from 80% to 100% of the rosin present in the solution, water being present in amount such as to produce an emulsion or colloidal solution containing the rosin, alkali, water, and rosin solvent. In one run this emulsion contained 190 parts by weight of water, about 26 parts NaOH, 193 parts of rosin, and (800 X sp. gr.) parts of kerosene. Smaller proportions of water tend to produce a less stable emulsion requiring agitation. This colloidal solution or emulsion, either heated or unheated, is flowed, preferably in fine streams into the hot mother liquor, or into a hot solution of rosin in a rosin solvent, maintained at a temperature well above the normal boiling point of water, and, when kerosene is the solvent, at temperatures around 190° to 200° C. As the emulsion strikes the highly heated kerosene, the water present is very quickly evaporated at the surface of the liquid, and is removed by suitable apparatus, thus insuring the absence from the body of hot solution of sufficient water to cause the formation of a jelly or grease such as is normally formed by mixtures of water, alkali, rosin, and solvent when there is present an insufficient amount of free rosin to prevent it. As a result of the constant addition of the above-described solution to the body of mother liquor or rosin solution, there is a continuous precipitation from the latter of the desired neutral resinate. After the vessel containing the treated mother liquor contains sufficient sodium resinate and the mixture is of a thick consistency, the latter is withdrawn and is filtered while hot in a filter press or centrifuge, and is then washed with clean solvent and dried.

It will therefore be recognized by those skilled in the art that by the separation of the fatty compounds and other oxygen-containing compounds from the rosin, and the removal therefrom of certain coloring and odor-producing materials, applicant has succeeded in rendering dark, low-grade rosin and rosin residues sufficiently free from these substances to permit the production of crystallizable rosin and high grade resinates from certain raw materials not otherwise adapted for the purpose, while simultaneously recovering these valuable oily substances, fatty acids, and the like in a form suitable for many uses, particularly in the soap industry.

The accompanying drawing illustrates diagrammatically apparatus adapted for the practice of the present invention. Referring more particularly to the drawing, "black liquor", or the concentrated soap or resinous mass skimmed from such "black liquor", or other rosin-bearing material containing oily or fatty substances and rosin in the presence of an alkaline solution, is fed into the mixing tank 3, through the inlet valve of hopper 42. To this material in tank 3 is added a suitable volume of a rosin solvent such as kerosene, naphtha, gasoline, or the like, from either the solvent tank 5 or the tank 6. Within the mixing tank 3 the mixture of rosin-containing substance and solvent is treated with an acid, preferably by the continuous passage therethrough of an acid or acid substance in gaseous form, such as $SO_2$ or the waste gases from a black ash furnace, although sulphuric or other mineral acid, or an acid salt such as nitre cake, may be employed.

In the form of the invention shown, sulphur dioxide is produced in a sulphur burner 2, the latter of which is supplied with air by the pump 1. The rosin and certain organic acids and oily substances when present, are dissolved in the solvent as rapidly as liberated by the acid or acid gas. The tank 3 is provided with agitating means 37. As the treatment with hot acid gas proceeds, the mass is heated to a point promoting the release of the rosin and oily and fatty substances. In the event that a mineral acid or a cold acid gas is used, the mixing tank 3 is provided with a heating coil for maintaining a suitable temperature facilitating the rosin releasing reaction.

The tank 3 is provided with a reflux condenser 4, which is so operated that any solvent volatilized or mechanically carried out of the mass by the acid gases being withdrawn, is condensed and returned to the still.

As already indicated, the solvent employed is preferably a hydrocarbon such as gasoline or kerosene, and is added in such amounts as to provide a ratio of total rosin and oily or fatty substances to solvent of from one part by weight of the former to 5 or more parts of the solvent.

The acid-treated mixture is then forced by pump 12 either directly to the settling tanks 7 or indirectly thereto through a filter (not shown). The mixture is then permitted to settle in the tanks 7, whereupon it separates into three layers; i. e. (a) a lower aqueous layer containing the water soluble salts resulting from the black liquor treatment, and which may be returned by the pump 13 to the recovery room of the pulp mill; (b) a middle layer containing some water and solvent and certain bodies insoluble in the cold dilute rosin solution as well as in the lower aqueous layer. This middle layer may be filtered to recover any solvent and resin therein. The filtrate is allowed to stand and a water layer which forms is separated and returned to the recovery room of the pulp mill to recover sodium salts therefrom. A solvent layer which likewise forms is added to the layer (c) herebelow described. The insoluble material (nigger) upon the filter is fed to the black ash furnace of the mill, a top layer (c) which contains a solution of rosin, fatty substances and other oxygen-containing compounds, in a rosin solvent. This top layer yields a clear solution when suitably diluted and the precipitate therefrom settled, as hereinbefore described. This dilution may be effected by flowing additional solvent into the material in tank 7 from the solvent supply tank 6 through the valve-controlled lines 43.

The solution forming the top layer is then forced by pump 10 to the storage tank 11, from which it is fed as needed to a regulator tank 8. From the latter the pump 14 forces it under pressure into a preheater, shown diagrammatically at 9, wherein it is heated while under pressure to a temperature between 175° and 250° C., depending upon such factors as the amount of solvent present, the boiling point of the solvent, and the degree of vacuum under which the subsequent distillation is to be effected.

The preheated rosin solution is then sprayed or otherwise finely dispersed into the vacuum still 15, which is provided with a bubble-plate column or dephlegmator 115, in which the pressure upon the solution is suddenly released, while maintaining the said temperature. The temperature and degree of vacuum are maintained such that, under the influence of the partial pressure effect of the solvent, the oily or fatty substances are vaporized and flow overhead from the upper part of the column to the primary condenser 16, while the rosin is unvaporized and remains behind as a still product.

Any condensate formed in condenser 16 is refluxed and returned to the still 15. The uncondensed vapors flow to condenser 17, the latter of which is maintained at a temperature adapted to condense the oily and fatty materials present in the vapors. The condensate is recovered in the receivers 18.

The more volatile solvent vapors then flow to condenser 25, and are there condensed and passed to receivers 19, from whence pump 21 returns them to the solvent tank 6.

A vacuum preferably of 27 or more inches of mercury is maintained upon the still, induced by suitable means not shown.

When it is desired to produce a high grade crystallizable rosin from the dark resinous still residue in still 15, it is flowed in molten form or in solution from the receivers 27 by means of the pump 20 into the tank 24 where a rosin solution is prepared containing 1 or more parts by weight of solvent to each part of rosin. The rosin solution may then be flash-distilled in a still such as the still 15, under high vacuum in the manner hereinbefore described, and the rosin condensed in the presence of a portion at least of the solvent, from which it is subsequently crystallized upon suitable concentration and cooling of the distillate.

If the said dark still residue is to be used for the manufacture of my neutral water soluble resinate, the former is forced in molten form from receivers 27 by pump 20 into mixing tank 24 having agitating means 38. In the tank 24 the impure rosin is dissolved in rosin solvent which may be drawn from tank 6 by pump 26. The resultant rosin solution, preferably containing 1 part by weight of rosin to at least 3 parts of solvent, is then forced by pump 23 to tank 34 where it is treated and agitated with an aqueous solution of caustic alkali, as previously described.

The resultant colloidal solution or emulsion, either in cold or heated condition, is then introduced by pump 40 into the body of hot liquid in the still 31 through spray nozzles. Additional solvent is fed to the still by pump 26 as required for replacing solvent distilled away; and the still is heated, as by steam coils 41. The still may be provided with agitating means. In the form shown the materials in the still are agitated by rapid circulation of the same within the still by means of recirculating pump 32 and interconnecting valve-controlled lines. The water and any solvent distilled away during this treatment are condensed in 33, and the condensed solvent is separated from the water in separator 36, the solvent being conducted to storage tank 6.

Precipitated sodium resinate is withdrawn periodically or continuously from the still 31 under the influence of pump 32, and is fed to the centrifuge 29, where it is whizzed and washed with fresh rosin solvent fed thereto by pump 26. The solvent thus extracted flows to solvent tank 30, from which it is returned to the solvent tank 5 for reuse through float-controlled pump 37. The thus purified resinate is withdrawn from the centrifuge in well known manner, and if desired may be further washed or treated to remove traces of the said rosin solvent or to remove solvent odors.

If it is desired to produce sodium resinate from a distilled rosin instead of the still residue, in order to secure a purer material, and from a material in which the fatty acids are removed wholly or in part, the temperature of the preheater is raised, as in the case of distilling rosin preferably to above 240° C. and the mixture flash vaporized as heretofore described. The solvent and most of the fatty acids are carried through the column or the lower sections at least while the rosin is condensed in the lower sections of the dephlegmating column. It is discharged through the draw-off pipe 44 into the receivers 45 and thence through line 46 it is periodically removed while in molten form to the solvent tank 24. Here the rosin is dissolved in one or more parts of solvent and the solution is carried through the resinate process in the same manner as described above when the dark still residue is used for the manufacture of sodium resinate.

It will be understood by those skilled in the art that when the raw materials from which the highly purified rosin is to be recovered contains rosin in its free form as such, in the absence of alkali resinates, and with or without the presence therewith of fatty or oily compounds and other oxygen-containing substances, the step of mixing and pretreating such raw materials with an acid or acid gas hereinbefore mentioned may be omitted, and the rosin is dissolved directly in a rosin solvent and is treated from that point in accordance with the steps herein set forth. It is likewise to be understood that the rosin solution produced in the mixing vessel 24 may be used for the production of a highly purified rosin instead of for the manufacture of sodium resinate. The mixture of fatty substances and other oxygen-containing organic compounds recovered in the receivers 18 may, if desired, be refined by suitable treatment such as by redistillation in high vacuum at temperatures below their decomposition temperatures, and if desired, in the presence of a stream of a volatile solvent therefor for the purpose of taking the advantage of the partial pressure effect of the latter.

While the use of certain apparatus has been indicated in the above description of my invention, it will be obvious that the use of other apparatus adapted to perform the various functions of the apparatus described in this case comes within the purview of the present invention; and that, for example, filter presses or continuous centrifuges may be substituted for the centrifuge diagrammatically shown herein.

While certain organic solvents have been specifically mentioned in the case, it is to be understood that the invention is in no wise limited to the use of such solvents. On the contrary, any rosin solvent is suitable for use, providing that it is liquid at normal atmospheric temperatures, that it is substantially insoluble in water, and that it has a vapor pressure higher than that of rosin. Such solvents as the various water-insoluble higher aliphatic alcohols, chloroform, carbon disulphide, ethers, monochlorbenzol and other chlorinated hydrocarbons and esters such as ethyl acetate, and oleic acid, or mixtures thereof may be employed.

This application is a continuation in part of my copending patent application, Serial No. 598,351 filed March 12, 1932 for Production of pure by-products from resin-containing liquors.

The invention is susceptible of modification within the scope of the appended claims.

I claim:

1. The process of producing a water-soluble resinate from rosin which comprises dissolving the rosin in a water-insoluble rosin solvent, adding sufficient of an alkaline alkali metal compound to neutralize at least the major portion of the rosin in the presence of water thereby forming a more or less permanent emulsion, introducing the resultant emulsion into a body of water-insoluble rosin solvent maintained at a temperature substantially above the boiling point of water, thereby rapidly distilling away the water and a portion of the solvent and precipitating the resinate in granular form, and recovering the latter.

2. The process as defined in claim 1 according to which the said emulsion is introduced into a body of rosin solvent maintained at a temperature around 200° C.

3. The process as defined in claim 1 according to which the body of solvent is agitated during the introduction thereto of the said emulsion.

4. The process as defined in claim 1 according to which the said emulsion is continuously introduced into the body of hot rosin solvent, and the portion of rosin solvent distilled away is recovered and continuously returned to the said body of solvent.

5. The process as defined in claim 1, together with the additional steps of washing the recovered resinate with a rosin solvent.

6. The process of producing a water-soluble resinate from rosin which comprises dissolving the rosin in a water-insoluble rosin solvent, adding sufficient of an aqueous solution of an alkaline alkali metal compound to neutralize from 90 to 100% of the rosin in the said solvent, thereby forming a more or less permanent emulsion, introducing the said emulsion into a body of rosin solvent maintained at a temperature well above the boiling temperature of water, thereby rapidly distilling away the water while maintaining the solvent present and precipitating the resinate in granular form, and recovering and washing the latter.

7. The process as defined in claim 6, including the steps of filtering the precipitated resinate while hot, thereby separating it from the excess of the rosin solvent, and thereafter washing it with fresh rosin solvent.

8. The process of producing a water-soluble resinate from hot mother liquor containing a water soluble alkali, rosin and an organic water-insoluble rosin solvent, which comprises introducing into a heated body of the said liquor while maintaining the latter above 212° F. a fine stream of a colloidal solution containing rosin, a water-insoluble rosin solvent and an aqueous solution of caustic alkali, the said alkali being present in amount sufficient to neutralize from 80% to 100% of the rosin present in the said colloidal solution, and the water being present in amount sufficient to produce the said colloidal solution, continuously removing the water vapors thus produced thereby precipitating the resinate, and recovering the resultant resinate.

9. The process of producing a water soluble resinate from hot mother liquor containing a water soluble alkali, rosin, and an organic water-insoluble rosin solvent, which comprises spraying a stream of a colloidal solution containing rosin, kerosene, and an aqueous solution of caustic alkali upon the surface of a body of mother liquor maintained at from 190° to 200° C., continuously removing the vapors thus produced, while precipitating a neutral alkali metal resinate, and recovering the said resinate.

10. The process of producing a water soluble resinate, which comprises flash-vaporizing a mixture of crude rosin in a water-insoluble organic solvent having a higher vapor pressure than rosin, dephlegmating the resultant vapors to recover a molten rosin largely free from fatty acids and color producing impurities, dissolving the rosin in a quantity of the said solvent, adding sufficient of an alkaline alkali metal compound to neutralize at least the major portion of the rosin in the presence of water, thereby forming an emulsion, and distilling off the water while maintaining at least a portion of the solvent present, thereby precipitating the neutral resinate in the presence of the rosin solvent, and recovering the resinate.

11. In the process of producing a water soluble resinate, the step of flash vaporizing the water content of a hot colloidal solution containing rosin, a water-insoluble rosin solvent having a boiling point higher than that of water, and an aqueous solution of caustic alkali, while in contact with a body of heated mother liquor containing crystallizable rosin and a rosin solvent.

12. The process of producing from crude rosin a water-soluble resinate substantially free from color-producing bodies, which comprises dissolving the rosin in a water-insoluble rosin solvent in the proportion of approximately 1 part by weight of rosin to at least 5 parts of the solvent, removing the precipitate thus produced, thereafter removing a portion of the solvent, reacting the remaining solution with an aqueous alkaline solution of an alkali metal compound sufficient in amount to neutralize at least a major portion of the rosin, removing the water present, thereby precipitating the water soluble resinate in the presence of the said solvent, and recovering the resinate.

13. The process of producing a water-soluble resinate which comprises spraying a liquid containing rosin, a water-insoluble rosin solvent and an aqueous solution of caustic alkali upon the surface of a body of a water-insoluble rosin solvent containing dissolved rosin and maintained at a temperature substantially above the boiling point of water, the said alkali being present in the liquid in amount sufficient to neutralize from 80 per cent to 100 per cent of the rosin present therein, continuously removing the vapors thus produced while precipitating an alkali metal resinate, and recovering the said resinate.

14. The process of producing a water-soluble resinate from a mixture containing crude rosin, fatty acids and color-producing bodies and derived from alkaline pulping liquors by an acid treatment, which comprises adding to the mixture a water-insoluble rosin solvent in amount sufficient to provide in the mixture a ratio of total rosin and fatty acids to solvent of 1 to at least 5 parts, removing the precipitate thus formed, fractionally distilling the remaining liquid thereby separating the rosin from the fatty acids, dissolving the former in a water-insoluble rosin solvent having a boiling point above that of water, reacting the resultant solution at a temperature above the boiling point of water with an aqueous alkaline solution of an alkali metal compound in amount sufficient to neutralize the major portion at least of the rosin, evaporating and removing the water present thereby precipitating the water-soluble resinate, and recovering the latter.

15. In the process of producing a water-soluble resinate, the step of flash vaporizing the water content of a colloidal solution prepared from rosin, a water-insoluble rosin solvent, and an aqueous alkaline solution of an alkali metal compound, while in contact with a body of mother liquor containing rosin and a rosin solvent maintained at a temperature substantially above the boiling point of water, and recovering the resinate thus precipitated.

16. In the process of producing a crystallizable water-soluble resinate, the steps of quickly vaporizing and removing at a temperature above the boiling point of water the water content of a hot liquid containing rosin, a water-insoluble rosin solvent having a boiling point higher than that of water, and an aqueous solution of an alkaline alkali metal compound, while contacting the said liquid with a body of heated liquid containing crystallizable rosin and a water-insoluble rosin solvent.

EDWARD H. FRENCH.